Feb. 29, 1944.     G. V. PICKWELL     2,343,079
COUPLING
Filed Dec. 22, 1941

INVENTOR
GLENN V. PICKWELL his ATTORNEYS

Patented Feb. 29, 1944

2,343,079

UNITED STATES PATENT OFFICE 2,343,079

COUPLING

Glenn V. Pickwell, Dayton, Ohio, assignor to General Motors Corporation, Detroit, Mich., a corporation of Delaware Application December 22, 1941, Serial No. 423,950

2 Claims. (Cl. 64—15)

This invention relates to an improved machine element and the method of making it.

It is among the objects of the present invention to provide a husky torque absorbing coupling capable of being produced commercially without any appreciable variation in the characteristics of the numerous members produced.

A further object of the invention is to provide a torque absorbing coupling adapted operatively to connect a power or drive shaft with a load or driven shaft and which is securely supported by said shafts, said coupling being adapted to transmit the rotative movement of the power shaft to the load shaft and to cushion and absorb any pulsations that may occur in the movement of the power shaft, thereby preventing the pulsations from being transmitted to the load shaft.

These objects are accomplished by providing a coupling comprising rigid, collar-like mounting portions adapted to be secured to and supported by the shafts, said mounting portions being connected together in spaced relation by an integral helical portion which normally transmits the rotative movement of the drive shaft to the driven shaft, but which is adapted to yield under the effect of pulsations in the movement of the drive shaft, thereby cushioning and absorbing said pulsations and preventing their transmission to the driven shaft.

Where a solid shaft is used operatively to connect an internal combustion engine as used in airplanes with a fuel pump or booster pump, fracture of the shaft will at times take place due to the pulsations in the rotary movement provided by the engine and transmitted through such shaft to the fuel pump or booster which is acting upon a non-compressible element, the liquid fuel. To avoid such fractures, the driving shaft of the engine is connected to the shaft of the pump or booster by a yieldable coupling, usually in the form of a coil spring, sufficiently heavy to transmit the normal driving power from the engine shaft to the pump shaft. Such springs are usually made by wrapping a wire or metal bar about a mandrel then forming the end convolutions into eyelets by means of which the spring may be attached to the respective elements to be connected. To produce springs commercially and especially in large numbers without having any appreciable variation in the characteristics of the numerous springs is a very difficult problem, and usually entails prohibitive scrap of material.

The present invention provides a husky torque absorbing coupling which may be made in large numbers, one like the other without any appreciable difference and entailing very little loss of material. A piece of spring steel or tool steel seamless tubing of proper length, outside and inside diameter may be used, or a rod of such material may be bored out to provide such a tubular member. Then a spindle or core of a softer metal is secured in said tubular member, by soldering or any suitable way to secure the spindle against movement in the tubular member. A spiral slot is then cut completely through the annular wall of the tubular member, after which the spindle is removed and the coupling then heat treated to the proper degree of hardness. By providing stock material having the same specifications, all couplings made therefrom will be substantially identical in characteristics for the operations to form the coupling have little or no effect upon the metallic structure of the material, excepting of course the heat treatment which, in all instances, is regulated to produce the proper degree of hardness in the finished piece.

Further objects and advantages of the present invention will be apparent from the following description, reference being had to the accompanying drawing wherein a preferred embodiment of the present invention is clearly shown.

Figure 1:
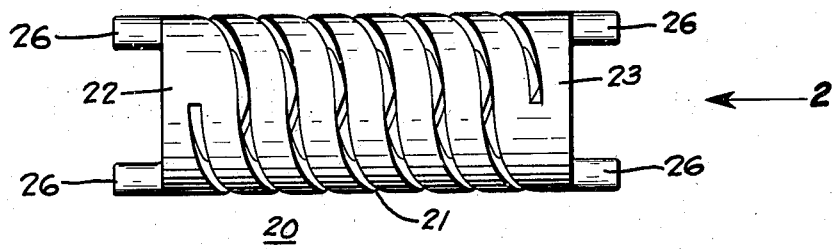
Fig. 1 is an enlarged side view of the torque absorbing coupling.
Figure 2:
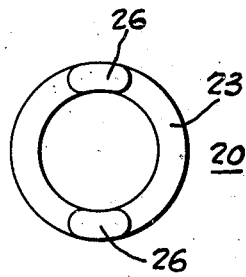
Fig. 2 is an end view thereof taken in the direction of the arrow 2 of Fig. 1.
Figure 3:
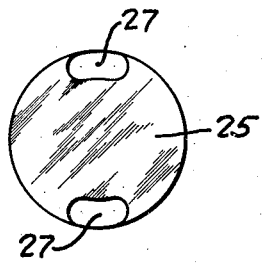
Fig. 3 is an end view of a shaft to which the coupling may be secured and connected.

Referring to the drawing and particularly to the Figs. 1 and 2, the shock absorbing coupling 20 is illustrated as being a tubular member. It may be made of seamless tool or spring steel tubing or as described herein by boring out a rod of the same material. Any number of helical slots 21 are cut entirely through the annular wall of the tube the present drawing showing a double slot. The pitch and number of the slots may be varied to produce couplings having desired characteristics. The respective ends of a slot are diametrically opposite or substantially 180° apart and terminate short of the respective ends of the coupling. This provides rigid, collar-like ends 22 and 23, forming mounting portions by means of which the coupling may be securely anchored to the aligned adjacent ends of the driving and driven shafts to be connected.

Figure 4:
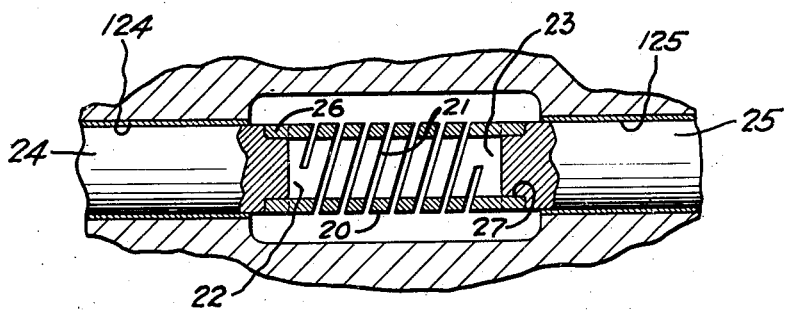
Fig. 4 is a sectional view showing the coupling secured between and connecting two shafts.

In Fig. 4 the driving shaft is designated by the numeral 24 and the driven shaft by 25.

The ends of the coupling are machined to provide longitudially extending tangs 26 of such a size and shape as to be adapted to nest in notches 27 of similar size machined in the circumferential surface of the driving and driven shafts 24 and 25.

In order to obtain smooth, balanced operation, it is desirable to so machine the ends of the coupling that the two tangs 26 at each end of the coupling are diametrically opposite and that their center is at approximately 90° to the ends of the two-slots as shown in Fig. 1.

From the aforegoing it may clearly be seen that applicant has provided a torque absorbing coupling comprising rigid mounting collars each provided with longitudinally extending anchoring tangs, said collars being secured together in spaced relation, by helically shaped elements integral with said collars. Arranging the tangs 26, which are the points of load application upon the coupling, at approximately 90° relatively to the ends of the slots which form the helically shaped connecting elements and where the collar portion has its greatest area, provides for a balanced application of the power upon the cantilever like connection between the helically shaped connecting elements and the rigid collars thereby substantially eliminating distortion due to the unbalanced aplication of forces upon and through a yieldable element. The rigid collar portions provide for a solid mounting of the coupling upon and between the two shafts to be operatively connected therefore eliminating undesirable and sometimes damaging whipping of the coupling especially at high speeds which will occur where ordinary springs are pivotally secured to studs on the shafts passing through eyelets provided by the spring ends.

The process for producing a coupling as illustrated, which as shown in Fig. 4, drivingly connects, as for instance, an engine driven power shaft 24, journalled in the bearing 124 with an aligned, driven or fuel pump shaft 25 journalled in bearing 125, comprises the following steps:

When tool steel or spring steel bar stock is used, measured lengths are centrally bored out to predetermined size. A softer metal core or spindle is then sweated or soldered in the bored out piece, after which the helical slot or slots are milled or cut in any suitable way, the cut passing entirely through and into the softer metal core whereby burrs within the sleeve are substantially eliminated and a clean cut obtained. As has been said before, the two ends of a slot are diametrically opposite or substantially 180° apart. After this slotting operation, the piece is "normalized," that is, it is subjected to heat of approximately 1500° which relieves the hard steel sleeve of inherent strains, the greater part of any distortion or twisting of the part due to the application of heat taking place at this time. This heating of the sleeve also releases the core or spindle previously soldered therein and permits its removal. Now the ends of the coupling sleeve are machined to form the longitudinally extending mounting tangs which, as has been described are diametrically opposite at each end and arranged so that their center is substantially at 90° relatively to the ends of the slots. Following this the coupling sleeve is heat treated and drawn so as to have spring hardness which in usual practice is approximately 43-45 Rockwell "C" degree. If necessary, interior and exterior grinding may be done to finish the piece.

Notches of a size and shape similar to the size and shape of the tangs are cut in the annular surface at the shaft ends to be connected so that the tangs of the coupling may be securely nested therein.

With a supply stock of tool or spring steel rod or seamless tubing meeting specifications, this method of producing this particular shock or torque absorbing coupling sleeve substantially eliminates variations in the characteristics of the finished product and thereby absorbs just the right amount of pulsating torque and transmits a uniform rotating torque without excessive vibration either in a rotating, an axial or a radial direction.

While the embodiment of the present invention as herein disclosed, constitutes a preferred form, it is to be understood that other forms might be adopted, all coming within the scope of the claims which follow.

What is claimed is as follows:

1. A torque absorbing coupling sleeve comprising a spring metal tubular member having a helical slot cut through its annular wall, the ends of the slot terminating at diametrically opposite sides, short of the ends of the said member so as to form rigid mounting portions; and tangs extending longitudinally from the ends of the said member, the center of said tangs being angularly arranged at substantially 90° relatively to the end of the helical slot.

2. A torque absorbing coupling adapted to connect a variably rotating driving shaft with a load shaft comprising, a tubular member having tangs at each end adapted to interlock with corresponding recesses in the driving and driven shafts so that said member is anchored to and supported by said shafts; and a helical slot through the annular wall of the member, the ends of said slot being substantially 180° apart and terminating short of the respective ends of the tubular member, the center of the tangs being arranged at approximately 90° relatively to the slot ends.

GLENN V. PICKWELL.